Dec. 1, 1970 W. E. MERWITZ, SR 3,544,276
REFRIGERANT SAMPLING AND TESTING DEVICE
Filed May 24, 1967 2 Sheets-Sheet 1
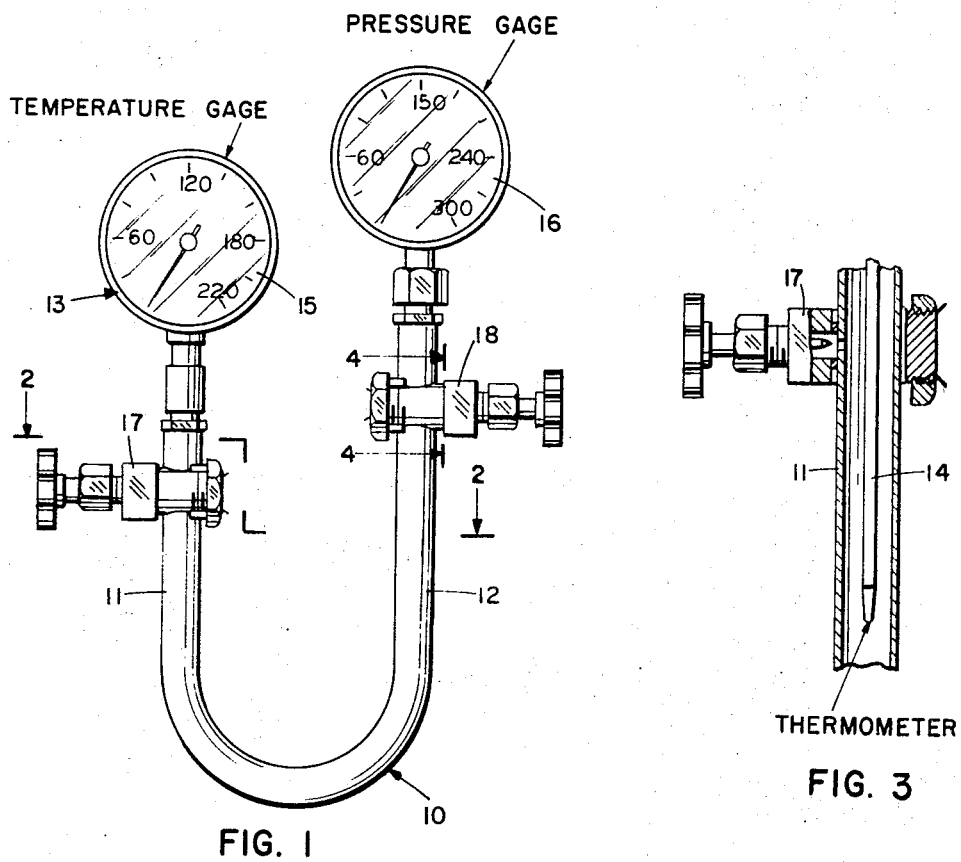
FIG. 1
FIG. 3
FIG. 2
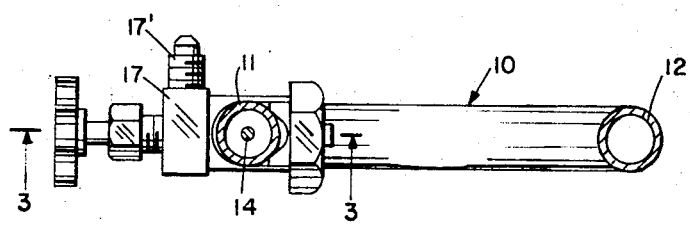
INVENTOR.
WILLIAM EDWARD MERWITZ SR.
BY
ATTORNEY Dec. 1, 1970  W. E. MERWITZ, SR  3,544,276

REFRIGERANT SAMPLING AND TESTING DEVICE

Filed May 24, 1967  2 Sheets-Sheet 2

INVENTOR
WILLIAM EDWARD MERWITZ SR.

BY

ATTORNEY

United States Patent Office 3,544,276
Patented Dec. 1, 1970

3,544,276
REFRIGERANT SAMPLING AND
TESTING DEVICE
William Edward Merwitz, Sr., 6300 Park Heights Ave.,
Baltimore, Md. 21215
Filed May 24, 1967, Ser. No. 641,030
Int. Cl. G01m 7/00, 31/22
U.S. Cl. 23—253
4 Claims

ABSTRACT OF THE DISCLOSURE

A refrigerant sampling and testing device having a U-shaped reception chamber with an inlet provided with a valve in one leg of the U, a temperature gage in the inlet leg, a vent with valve in the other leg of the U and a pressure gage in the vent leg, the vent further provided with a device for detecting contaminants in the refrigerant.

---

This invention relates to a testing device and more specifically to a device for testing the refrigerant in a refrigeration system for the purpose of identifying the specific type of refrigerant employed and also to determine whether contaminants are present which may adversely affect the operation of the system.

It is an object of this invention to provide such a testing device which is accurate, and can be relied upon when used by a refrigerator repair mechanic.

It is another object to provide a device of this character which is small in size and readily portable and can be carried as an accessory in a repair man's tool kit.

A still further object is to provide a test device of this character which is rugged and which will withstand the rough treatment to which such repairman's tools are usually subjected.

The above and other objects and advantages will become more apparent as this description proceeds and reference is had to the accompanying drawings forming a part of this specification, in which like reference characters designate like parts, and in which, FIG. 1 is a front elevational view of the device;

FIG. 2 is a sectional view on the line 2—2 of FIG. 1 looking in the direction of the arrows;

FIG. 3 is a fragmentary sectional view through the thermometer or temperature gage leg of the device;

Figure 4:
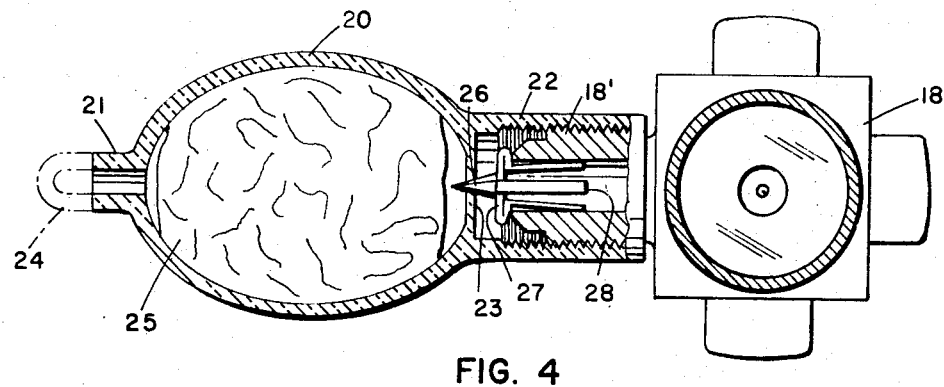
FIG. 4 is an enlarged section through the contaminant testing portion of the device.

Referring more specifically to the drawings, in which a preferred embodiment of my invention is disclosed, reference numeral 10 designates a U-shaped tubular main body member having branches 11 and 12 respectively.

The branch 11 has a thermometer or temperature gage generally indicated at 13 with a thermometer bulb or tube 14 extending well down in the said branch as shown in FIG. 3, and a gage face 15 at its upper end to indicate the temperature within the tube.

The branch 12 has a pressure gage 16 mounted at its upper end to indicate the pressure within the U-shaped tube.

A simple on and off valve 17 is provided in the branch 11 in close proximity to the upper end thereof which valve may be of any convenient type, for example, a needle valve as shown in detail in FIG. 3. This valve is provided with a connecting nipple 17'.

The branch 12 is provided with a similar valve 18 in close proximity to the pressure gage 16.

To use the above described device, the connecting nipple 17' is connected through a tube or other conduit means to a high pressure point in the refrigeration system, such as to the output side of the compressor or to the high perssure side of the condenser. Valves 17 and 18 are now opened and refrigerant from the system is allowed to enter the U-shaped tube, passing around the thermometer tube in branch 11 and up into branch 12 and out the valve 18. The flow of the refrigerant is allowed to continue until the U-shaped tube is completely purged of air or the remains of any previous test, after which the valve 18 and thereafter the valve 17 are closed. After stabilization of the gages the temperature and pressure as read on the gages is taken. As each type of refrigerant exhibits a certain temperature for each pressure (charts for which are generally available but form no part of this invention) the type of refrigerant used in the system may be readily identified.

The device illustrated in FIG. 4 may be applied to the outlet valve 18 if desired and it provides a convenient means for determining whether the refrigerant is contaminated such as, for instance, by acid. It consists of a bulb or tubular member 20 made of transparent plastic or similar material having a tip 21 at one end and a connecting nipple 22 at the other end. The bulb 20 and connecting nipple 22 are initially closed from each other by a thin wall or partition 23 while the tip 21 is initially closed as indicated by the dotted line portion 24 in FIG. 4.

The bulb 20 encloses a wad of porous fibrous material 25 saturated with a liquid such as litmus solution which will indicate the presence of acid by changing color. Also the fibrous material may be further treated with a solution for detecting the moisture contents of the refrigerant.

Figure 5:
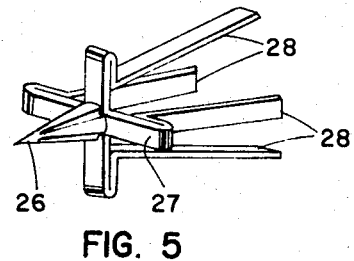
FIG. 5 is an enlarged perspective view of the piercing device used in the contaminant testing portion shown in FIG. 4.
Figure 6:
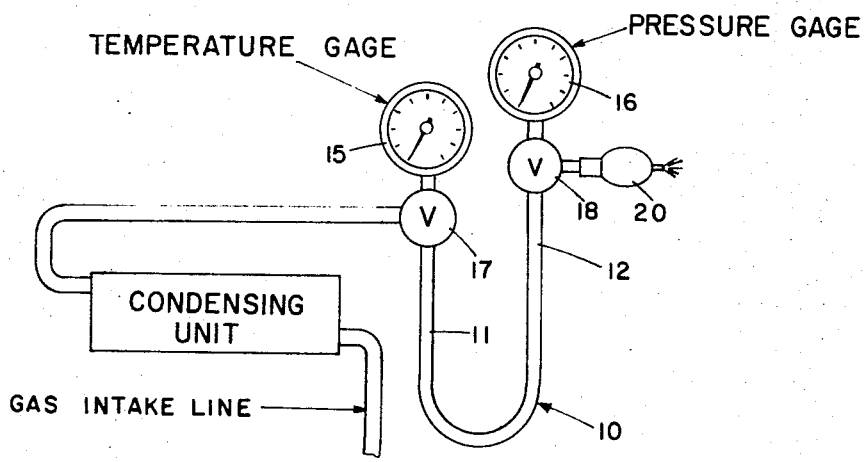
FIG. 6 is a diagrammatic view of one method of connecting the device in a refrigeration system, the latter being only partly shown.

The device shown in FIG. 5 is a prick-punch and consists of a grooved point element 26 extending outwardly from a cross-shaped base 27 which in turn is provided with legs 28 extending rearwardly therefrom in a direction opposite the point element 26.

To use the contaminant testing device the prink-punch 26, 27, 28 is inserted in the outlet nipple 18' of the valve 18 with the legs 28 extending within the nipple and the cross-shaped base resting on the end thereof with the point 26 extending outwardly. The bulb is then attached through nipple 22 to the valve 18. The act of connecting the bulb to the valve will cause the point 26 to puncture the wall 23. The tip 21 is then cut off and the test previously described begun. As the refrigerant passes through the bulb and its fibrous filler 25 the presence of acid contaminant will be registered by a change in color of the filler material.

The contaminant tester bulb is designed as a single use, throw away item which may be cheaply manufactured.

Having thus described a preferred embodiment of my invention, I wish it understood that I do not desire to be limited thereto, but only to the extent required by the prior art and as defined in the appended claims.

What I claim and desire to secure by Letters Patent is:

1. A refrigerant sampling and testing device comprising,
   a U-shaped tube forming a closed chamber,
   a temperature gage in one leg of the U-shaped tube,
   a pressure gage in the other leg of the U-shaped tube,
   an inlet valve adjacent the temperature gage on the said one leg of the U-shaped tube provided with inlet means adapted to be connected to a refrigeration system, and an outlet valve adjacent the pressure gage on the said other leg of the U-shaped member, whereby refrigerant from a pressure point in a refrigeration system introduced through the inlet valve may flow into the said one leg and around the U-shaped member and out the said other leg and outlet valve to purge the device and insure accurate temperature and pressure readings in the gages.

2. A refrigerant sampling and testing device as defined in claim 1 in which the outlet valve is provided with means for detecting acid contaminant in the refrigerant passing through said outlet valve.

3. The structure defined in claim 1, in which said means for detecting acid contaminant comprises
   a transparent tube,
   a quantity of fibrous material in said tube, said fibrous material containing a substance which changes color in presence of acid.

4. The structure defined in claim 3 in which said transparent tube is initially sealed with a closed partition at one side of said fibrous material and a sealed tip at the other side of said fibrous material, said tip being adapted to be cut off, and means to puncture the partition to provide passage of the refrigerant through the fibrous material.

References Cited

UNITED STATES PATENTS

| | | | |
|---|---|---|---|
| 2,239,221 | 4/1941 | Dimmock | 73—345 |
| 2,429,694 | 10/1947 | King | 23—254 |
| 2,506,806 | 5/1950 | Metzger | 23—254 |
| 3,238,020 | 3/1966 | Eiseman | 23—253 |

OTHER REFERENCES

Jordan, R. C. et al.: Refrigeration and Air Conditioning (1948).

Magnirs, E. R. et al.: The Refrigeration Serviceman's Manual (1948).

JOSEPH SCOVRONEK, Primary Examiner

E. A. KATZ, Assistant Examiner

U.S. Cl. X.R.

23—254; 62—125; 73—30, 345